United States Patent
Morrow

(10) Patent No.: US 7,415,577 B2
(45) Date of Patent: Aug. 19, 2008

(54) METHOD AND APPARATUS TO WRITE BACK DATA

(75) Inventor: Michael W. Morrow, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 655 days.

(21) Appl. No.: 10/799,555

(22) Filed: Mar. 10, 2004

(65) Prior Publication Data

US 2005/0204099 A1    Sep. 15, 2005

(51) Int. Cl.
*G06F 12/00* (2006.01)
(52) U.S. Cl. ..................... 711/143; 711/144
(58) Field of Classification Search ............. None
See application file for complete search history.

(56) References Cited

U.S. PATENT DOCUMENTS 6,134,634 A * 10/2000 Marshall et al. ............ 711/143
6,564,301 B1 * 5/2003 Middleton ................. 711/144
7,076,613 B2 * 7/2006 Peir et al. .................. 711/141

OTHER PUBLICATIONS

John L. Hennessy, et al., "Computer Architecture", A Quantitative Approach, 3rd Addition 2003, pp. 390-402, 460-465, 549-554.

* cited by examiner

*Primary Examiner*—T Nguyen
(74) *Attorney, Agent, or Firm*—Cyndi M. Wheeler

(57) ABSTRACT

Briefly, in accordance with an embodiment of the invention, a method and apparatus to write back data is provided. The method may include setting a status corresponding to a block of data in response to a change in address mapping to indicate that the block of data is pending write back. The apparatus may include a storage area to store a status associated with a block of data to indicate that the block of data is pending write back and is not accessible with the current address mapping. Other embodiments are described and claimed.

35 Claims, 3 Drawing Sheets

| Virtual Addr | Physical Addr | Valid | Dirty | WB | Data |
|---|---|---|---|---|---|
| 0x123400 | 0x999900 | 1 | 1 | 1 | xxxxxxxxxxxxxxxxxxxxxxxxxxxxxxxxxxxx | 301 |
| 0x1abc00 | 0x112200 | 1 | 0 | 0 | wwwwwwwwwwwwwwwwwwwwwwwwwwwwwwwwww | 302 |
| 0x888800 | 0x543200 | 1 | 1 | 1 | yyyyyyyyyyyyyyyyyyyyyyyyyyyyyyyyyyyy | 303 |
|  |  | 0 | - | - |  |

300

| Virtual Addr | Physical Addr | Valid | Dirty | WB | Data |
|---|---|---|---|---|---|
| 0x123400 | 0x999900 | 1 | 1 | 1 | xxxxxxxxxxxxxxxxxxxxxxxx |
| 0x1abc00 | 0x112200 | 1 | 0 | 0 | wwwwwwwwwwwwwwwwwwwwwww |
| 0x888800 | 0x543200 | 1 | 1 | 1 | yyyyyyyyyyyyyyyyyyyyyyyy |
| | | 0 | - | - | |

METHOD AND APPARATUS TO WRITE BACK DATA

BACKGROUND

Two methods for writing information in a multilevel memory hierarchy may include "write through" and "write back." Write through may refer to when information is written to both the cache memory and to a lower-level memory in the memory hierarchy. Write back may refer to when information is written only to the cache memory and may be written to the lower-level memory at a later point in time.

Determining when to write back the information to the lower-level memory may involve many factors and tradeoffs in terms of system performance.

Thus, there is a continuing need for alternate ways to write back data in a computing system.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

FIG. 3 is a diagram illustrating cache lines in accordance with an embodiment of the present invention.

Figure 1:
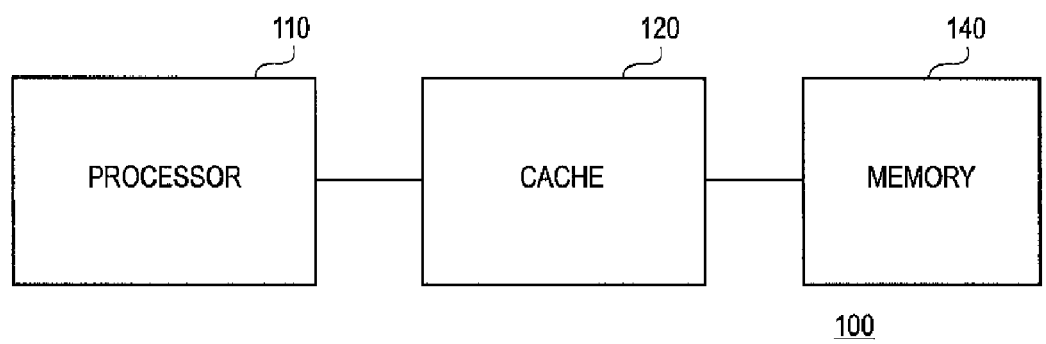
FIG. 1 is a block diagram illustrating a computing system in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

In the following description and claims, the terms "include" and "comprise," along with their derivatives, may be used, and are intended to be treated as synonyms for each other. In addition, in the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 is a block diagram illustrating a computing system 100 in accordance with an embodiment of the present invention. System 100 may include a processor 110, a cache memory 120 coupled to processor 110, and a memory 140 coupled to cache memory 120. Cache memory 120 may also be simply referred to as a cache.

Although not shown, system 100 may include other components such as, for example, more processors, input/output (I/O) devices, a storage device such as a disk memory coupled to memory 140. However, for simplicity these additional components have not been shown.

Processor 110 may include logic to execute software instructions and may also be referred to as a core, a controller or a processing unit. Memories 120 and 140 may be volatile or nonvolatile memories capable of storing software instructions and/or data. The terms "data" or "information" may be used to refer to either data, instructions, or code. Although the scope of the present invention is not limited in this respect, in one embodiment, memory 120 may be a volatile memory such as, for example, a static random access memory (SRAM) and memory 140 may be a volatile memory such as, for example, a dynamic random access memory (DRAM). In this embodiment, cache memory 120 may have a relatively faster access time compared to memory 140.

In one embodiment, the components of system 100 may be integrated together on a single silicon die, or in an alternate embodiment the components may be discrete components. In one embodiment, processor 110 and cache memory 120 may be integrated together and memory 140 may be a discrete, external ("off-chip") component. In this embodiment, processor 110 may be said to include cache memory 120.

In an alternate embodiment, memory 140 may also be a cache memory. In this embodiment, cache memory 120 may be for example a level 1 (L1) cache memory and may be referred to as an inner cache and memory 140 may be for example a level 2 (L2) cache memory and may be referred to as an outer cache.

Memories 120 and 140 may collectively serve as the memory space, address space, or memory hierarchy of system 100. In one embodiment, memories 120 and 140 may form a multilevel memory hierarchy, wherein each memory is a level of memory in the memory hierarchy. The memory hierarchy of system 100 may be generally referred to as the memory of system 100.

The address space may be broken into fixed-size blocks. These blocks may be called pages and in one embodiment a block may be 4096 bytes, although the scope of the present invention is not limited in this respect.

A "write back" scheme, rather than a "write through" scheme, may be used to write information to the memory hierarchy of system 100. For example, a block of data, e.g., 32 bytes, may be written only to a block in cache memory 120, and to achieve coherency, this block of data may be written back to memory 140 at a later point in time after it is written to cache memory 120. In this example, memory 140 may be referred to as a backing store or a lower level of memory in the memory hierarchy. Writing back of information from a one level of memory to another may also be referred to as an "evict" operation or a "cast out" operation.

In one embodiment, virtual addressing may be used to access, e.g., read or write, information from a particular location in the memory hierarchy. For example, processor 110 may include a memory management unit (MMU) to provide virtual-to-physical address translation. Alternatively, or in addition, processor 110 may include other components to employ virtual addressing such as, for example, a segment register or a base offset register. With virtual addressing, processor 110 may generate virtual addresses that are translated by a combination of hardware and software to physical addresses, that may be used to access the memory hierarchy. This process may be called address mapping, memory mapping or address translation. Virtual addresses may also be referred to as logical addresses. In addition, in various embodiments cache memory 120 may be referred to as a virtually addressed cache, although the scope of the present invention is not limited in this respect.

Software processes executed by processor 110 may each use their own address mapping of virtual memory to physical memory to write and read information to and from the memory hierarchy. Examples of software processes may include, but are not limited to, word processing programs, spreadsheet programs, etc. Software processes may also be referred to as software applications or programs. Software processes may have multiple threads, wherein the threads of a process use the same address mapping.

In a virtual address system, when switching from one context to another, the address mapping may change. In other words, when switching from one software process to another, since each software process may have its own address mapping, the address mapping may change upon a switch from executing one software process to executing another software process.

System 100 may detect a change in virtual address mapping. For example, to change the virtual address mapping, an operating system running in system 100 may set up a different page table or invalidate a translation lookaside buffer (TLB) entry. Depending on the system, the address mapping may be changed frequently, e.g., every 16 milliseconds (ms) in some systems.

Generally, to achieve coherency, information stored in a buffer or a cache such as, e.g., cache memory 120, may need to be written back to outer or lower levels of the memory hierarchy such as, e.g., memory 140. This may occur frequently, for example, if the system uses virtual addressing. Then information stored in a cache or a buffer may need to be written back to another level of memory if the address mapping changes. For example, cache lines stored in cache memory 120 that are marked as "valid" and "dirty" may need to be written back to memory 140 if the virtual address mapping changes. A cache tag field may be associated with each cache line to provide information about the cache line. The cache tag field may also be referred to as status information or simply status, and may be stored in cache memory 120. A line of cache data may be about 32 bytes of data stored in cache memory 120, although the scope of the present invention is not limited in this respect.

The cache tag field may contain one or more bits to indicate whether a predetermined amount of cache data, such as a line or block of data, is valid. The cache tag field may also contain one or more bits to indicate whether the predetermined amount of cache data is dirty. A cache line may be marked dirty if the cache line has been modified while in the cache. When the address mapping changes, a cache line stored in a virtually addressed cache or buffer that is marked as dirty and valid may need to be written back to another level of memory for coherency. In one embodiment, the cache tag may also include one or more bits to indicate if a predetermined amount of cache data is pending or awaiting a write back.

Figure 2:
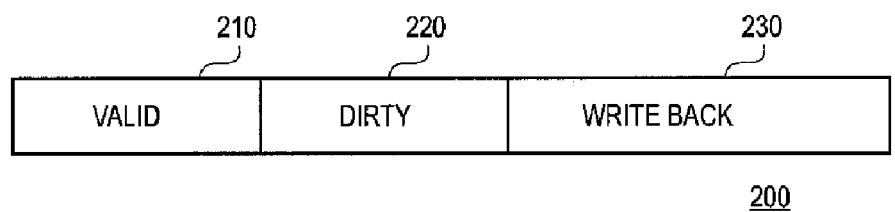
FIG. 2 is a diagram illustrating a cache tag in accordance with an embodiment of the present invention.

Turning to FIG. 2, a diagram illustrating a cache tag 200 is shown in accordance with an embodiment of the present invention. Cache tag 200 may include a valid bit 210, a dirty bit 220, and a write back (WB) bit 230. Cache tag 200 may be associated with or correspond to a predetermined amount of cache data (not shown) stored in cache memory 120 (FIG. 1). Cache tag 200 may be stored in a storage area of system 100 (FIG. 1). For example, cache tag 200 may be stored in a portion of cache memory 120.

Referring to both FIG. 1 and FIG. 2, processor 110 may include a circuit or circuitry such as, for example, digital logic to set or assert WB bit 230 in response to a change in address mapping to indicate that a block of data is pending write back from a first level of the memory hierarchy (e.g., cache memory 120) to another level of the memory hierarchy (e.g., memory 140). When set, WB bit 230 may also indicate that the block of data in the first level of the memory is not accessible with the current address mapping. In other words, after switching to executing another software process, the currently executing process may not be able to read or write information to the cache lines that have their corresponding write back bit(s) set.

In one embodiment, a first software process may be executed by processor 110. During execution, the first software process may use a first virtual address mapping to write information to cache memory 120. After the information is written to a cache line of cache memory 120, processor 110 may include logic to set the valid and dirty bits corresponding to the cache line. As an example, valid bit 210 and dirty bit 220 of cache tag 200 may be set. Then, the virtual address mapping may be changed in response to switching from executing the first software process to executing a second software process, wherein the second software process uses a second virtual address mapping different than the first virtual address mapping used by the first software process.

Processor 110 may include logic to detect the change in virtual address mapping and instead of writing back all the cache lines marked valid and dirty prior to execution of the second software process, processor 110 may set the write back bits of the valid and dirty cache lines stored in cache 120 to indicate that these lines are pending a write back at a later point in time.

Turning briefly to FIG. 3, a diagram 300 illustrating cache lines 301, 302 and 303 is shown. Diagram 300 also shows the corresponding cache tag information and physical and virtual addresses for caches lines 301-303. In one embodiment, in response to a change in address mapping, since cache lines 301 and 303 are marked as valid and dirty, these cache lines may have their corresponding WB bit set to indicate that these cache lines are pending a write back.

Turning back to FIGS. 1 and 2, in one example, in response to a change in address mapping, processor 110 may set WB bit 230 if valid bit 210 and dirty bit 220 are both set. Processor 110 may be adapted to write back the cache lines stored in cache 120 that have their corresponding WB bits set using either a "demand driven" write back scheme or a "lazy" write back scheme. Although the scope of the present invention is not limited in this respect, an example of a lazy write back scheme may be when access to the backing store is not otherwise needed, and processor 110 may detect when the backing store is not being accessed and then search through the cache tags and write back cache lines that have their corresponding WB bit set. An example of a demand driven write back scheme may be when no other free storage is available in cache memory 120 and system 100 may need to force write back of one or more of the cache lines that have their corresponding write back bit set. Another example of a demand driven write back scheme may be when power is about to be removed from system 100, and system 100 may need to force write back of one or more of the cache lines that have their corresponding write back bit set.

By using a write back bit, the software, e.g., the operating system, may not have to wait for the valid and dirty lines to be written back prior to execution of a subsequent software process. Execution of a subsequent software process may begin prior to writing back of all the cache lines that are marked valid and dirty in cache memory 120. This may result in a more efficient write back scheme in terms of performance.

In one embodiment, the cache lines having their corresponding WB bit set are non-usable or not accessible by the currently executing process. In this embodiment, processor 110 may include logic to prevent access to a cache line stored in cache memory 120 while the corresponding WB bit is set. In other words, processor 110 is adapted to prevent access to a cache line stored in cache memory 120 while the cache line is pending a write back to memory 140.

Although various embodiments above have been discussed using only one dirty bit, one valid bit, and one write back bit, this is not a limitation of the present invention. In alternate embodiments, a cache tag may include multiple dirty bits, valid bits, and write back bits per cache line. For example, if a cache line was divided into two portions, then two dirty bits, two valid bits, and two write back bits per cache line may be used to indicate status of each half of the cache line. Further, although various embodiments above have discussed using a virtually addressed cache, the methods may also be used with other virtually addressed storage elements such as, for example, a virtually addressed buffer.

Accordingly, as is discussed above, in one embodiment, a method and apparatus to write back data from one level of memory to another level of memory is provided. The method may include setting a status corresponding to a block of data in response to the change in address mapping to indicate that the block of data is pending write back from a first level of a memory hierarchy to a second level of the memory hierarchy and to indicate that the block of data in the first level of the memory is not accessible with the current address mapping. The status may be a bit in a cache tag field that may include information associated with the block of data. In other words, the status may be encoded in at least one bit in a cache tag. The apparatus may include a storage area to store the status associated with the block of data, wherein the status indicates that the block of data is pending write back and is not accessible with the current address mapping.

In another embodiment, an apparatus to write back a predetermined amount of data is provided. The apparatus may include a storage area to store status information about a predetermined amount of data, wherein the status information is updated in response to a change in address mapping and the status information indicates if the predetermined amount of data is awaiting a write back from one level of a memory hierarchy to another level of the memory hierarchy. In this embodiment, the apparatus may further include digital logic to prevent access to the predetermined amount of data by a currently executing software processes while the status information indicates that the predetermined amount of data is awaiting a write back. Although the present invention is not limited in this respect, in one example, the apparatus may be processor 110. The storage area may be located in cache memory 120, which may be located in processor 110.

In one embodiment, the software may not have to wait for a complete cleaning of cache memory, i.e., writing back of dirty data, when changing address mapping. Rather, the software may continue with execution of subsequent processes and the hardware may automatically set the write back bits of the valid and dirty cache lines. The hardware may prevent subsequent processes from accessing cache lines having their corresponding write back bit set, and the hardware may then write back the cache lines having their write back bits set opportunistically, e.g., using either a lazy write back scheme or a demand driven write back scheme.

Some systems may implement sharing of memory. In systems wherein cache lines are marked as pending a write back, address conflicts with future memory operations may be performed in a variety of ways including cache set identity or a directory at an outer level of cache. For example, two software processes may share a single memory and each software process may be using different virtual addresses to access the same physical address in the memory. In this example, to avoid conflicts in a system having multiple virtual addresses or aliases to the same physical address, a directory, an aggressive cleaning process, or a self snoop process may be used. A self snoop may include in response to a cache miss, the system may obtain a physical address to look again to make sure it does not have a copy with a different virtual address. An aggressive cleaning or over-cleaning process may include forcing write backs frequently to ensure that no conflict occurs for any alias that may correspond to a particular physical address. The directory may be used by various components to determine what information is stored and where it is stored.

Figure 4:
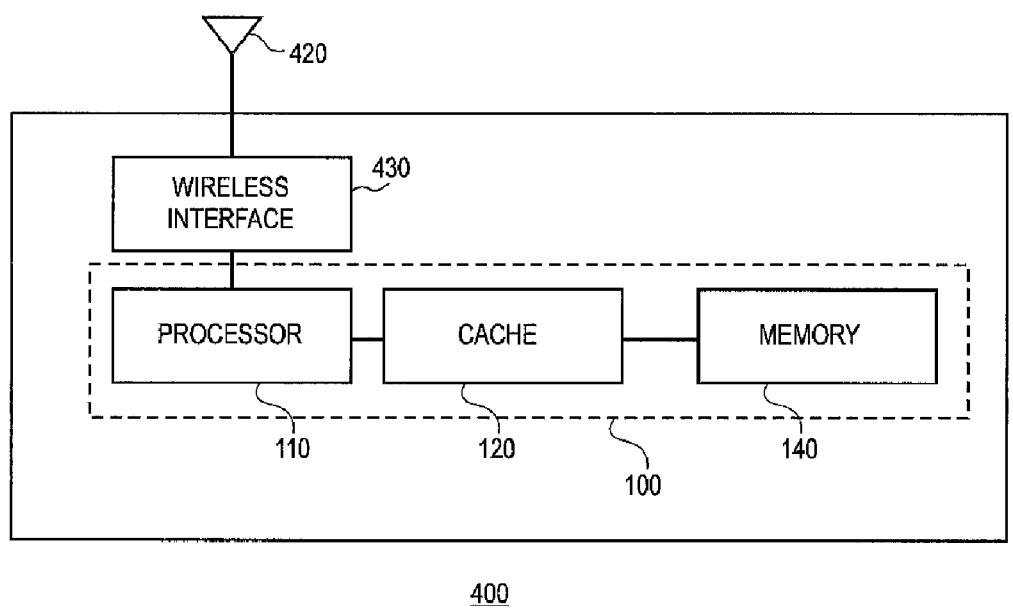
FIG. 4 is a block diagram illustrating a wireless device in accordance with an embodiment of the present invention.

Turning to FIG. 4, shown is a block diagram illustrating a wireless device 400 in accordance with an embodiment of the present invention. In one embodiment, wireless device 400 may use the methods discussed above and may include system 100 that is discussed above with reference to FIG. 1.

As is shown in FIG. 4, wireless device 400 may include an antenna 420 coupled to processor 110 via a wireless interface 430. In various embodiments, antenna 420 may be a dipole antenna, helical antenna or another antenna adapted to wirelessly communicate information. Wireless interface 430 may be adapted to process radio frequency (RF) and baseband signals using wireless protocols and may include a wireless transceiver.

Wireless device 400 may be a personal digital assistant (PDA), a laptop or portable computer with wireless capability, a web tablet, a wireless telephone (e.g., cordless or cellular phone), a pager, an instant messaging device, a digital music player, a digital camera, or other devices that may be adapted to transmit and/or receive information wirelessly. Wireless device 400 may be used in any of the following systems: a wireless personal area network (WPAN) system, a wireless local area network (WLAN) system, a wireless metropolitan area network (WMAN) system, or a wireless wide area network (WWAN) system such as, for example, a cellular system.

An example of a WLAN system includes a system substantially based on an Industrial Electrical and Electronics Engineers (IEEE) 802.11 standard. An example of a WMAN system includes a system substantially based on an Industrial Electrical and Electronics Engineers (IEEE) 802.16 standard. An example of a WPAN system includes a system substantially based on the Bluetooth™ standard (Bluetooth is a registered trademark of the Bluetooth Special Interest Group). Another example of a WPAN system includes a system substantially based on an Industrial Electrical and Electronics Engineers (IEEE) 802.15 standard such as, for example, the IEEE 802.15.3a specification using ultrawideband (UWB) technology.

Examples of cellular systems include: Code Division Multiple Access (CDMA) cellular radiotelephone communication systems, Global System for Mobile Communications (GSM) cellular radiotelephone systems, Enhanced data for GSM Evolution (EDGE) systems, North American Digital Cellular (NADC) cellular radiotelephone systems, Time Division Multiple Access (TDMA) systems, Extended-TDMA (E-TDMA) cellular radiotelephone systems, GPRS, third generation (3G) systems like Wide-band CDMA (WCDMA), CDMA-2000, Universal Mobile Telecommunications System (UMTS), or the like.

Although computing system 100 is illustrated as being used in a wireless device in one embodiment, this is not a limitation of the present invention. In alternate embodiments system 100 may be used in non-wireless devices such as, for example, a server, a desktop, or an embedded device not adapted to wirelessly communicate information.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method, comprising:
setting a status corresponding to a block of data that is stored in cache memory in response to a change in address mapping to indicate that the block of data is pending write back, wherein the status is a bit in a cache tag field, and wherein the cache tag field includes information associated with the block of data, and wherein setting the bit includes setting the bit if the block of data is valid and dirty.

2. The method of claim 1, further including changing the address mapping in response to switching from executing a first software process to executing a second software process, wherein the first software process uses a first address mapping and the second software process uses a second address mapping.

3. The method of claim 2, further comprising preventing access to the block of data by the second software process while the status is set.

4. The method of claim 2, wherein setting includes setting the status to indicate that the block of data is not accessible to the second software process.

5. The method of claim 2, wherein setting includes setting the status to indicate that the block of data is not accessible using the second address mapping.

6. The method of claim 2, wherein setting includes setting the bit in response to the change in address mapping to indicate that the block of data is pending write back from a first level of a memory hierarchy to a second level of the memory hierarchy and to indicate that the block of data in the first level of the memory hierarchy is not accessible with the current address mapping.

7. The method of claim 1, wherein setting includes setting the bit in the cache tag field if a valid bit of the cache tag field is set and if a dirty bit of the cache tag field is set, wherein the dirty bit indicates if the block of data has been modified while in the cache memory and the valid bit indicates if the block of data is valid.

8. The method of claim 1, further comprising writing back the block of data from a first level of memory to a second level of the memory using either a demand driven write back scheme or a lazy write back scheme.

9. An apparatus, comprising:
a storage area to store a status associated with a block of data to indicate that the block of data is pending write back and is not accessible with the current address mapping, wherein the status is encoded in at least one bit in a cache tag.

10. The apparatus of claim 9, wherein the block of data is cache data stored in a first level of a memory hierarchy and the at least one bit indicates that the block of data is pending write back to a second level of the memory hierarchy.

11. The apparatus of claim 10, wherein the first level of the memory hierarchy is an inner cache and the second level of the memory hierarchy is an outer cache.

12. The apparatus of claim 10, wherein the cache tag includes a valid bit to indicate if the block of data is valid and a dirty bit to indicate if the block of data has been modified while in the first level of the memory hierarchy.

13. The apparatus of claim 12, wherein the apparatus further includes digital logic to set the at least one bit if the valid bit is set and the dirty bit is set.

14. The apparatus of claim 9, wherein the apparatus further includes digital logic to set the at least one bit in response to a change in address mapping.

15. The apparatus of claim 9, wherein the storage area is located in a cache memory.

16. The apparatus of claim 15, wherein the cache memory is an static random access memory (SRAM).

17. The apparatus of claim 9, wherein the apparatus is a processor.

18. The apparatus of claim 17, wherein the processor includes logic to translate virtual addresses to physical addresses.

19. The apparatus of claim 9, wherein the apparatus is a virtually addressed cache memory.

20. The apparatus of claim 9, wherein the apparatus is a virtually addressed buffer.

21. An apparatus, comprising:
a storage area to store information about a predetermined amount of data, wherein the information indicates if the predetermined amount of data is awaiting a write back and the information is updated in response to a change in address mapping, and wherein the information is at least one bit in a cache tag.

22. The apparatus of claim 21, wherein the predetermined amount of data is cache data stored in a first level of a memory hierarchy and the at least one bit indicates that the block of data is awaiting write back to a second level of the memory hierarchy.

23. The apparatus of claim 22, wherein the cache tag includes a valid bit to indicate if the predetermined amount of data is valid and a dirty bit to indicate if the predetermined amount of data has been modified while in the first level of the memory hierarchy and wherein the apparatus farther includes digital logic to set the at least one bit if the valid bit is set and the dirty bit is set.

24. The apparatus of claim 23, wherein the address mapping is changed in response to switching from executing a first software process to executing a second software process and wherein the apparatus further includes digital logic to prevent access to the predetermined amount of data by the second software processes while the at least one bit is set.

25. The apparatus of claim 21, wherein the address mapping is changed in response to switching from executing a first software process to executing a second software process and wherein the apparatus further includes digital logic to prevent access to the predetermined amount of data by the second software process while the predetermined amount of data is awaiting the write back.

26. The apparatus of claim 21, wherein the apparatus is a processor and the processor includes logic to translate virtual addresses to physical addresses.

27. The apparatus of claim 21, wherein the apparatus is a virtually addressed cache memory.

28. The apparatus of claim 21, wherein the apparatus is a virtually addressed buffer.

29. A method, comprising:
  setting at least one bit to prevent access to a predetermined amount of data stored in a first level of a memory while the predetermined amount of data is pending a write back to a second level of the memory, wherein the first level of the memory is a cache memory; and
  storing the at least one bit in the cache memory.

30. The method of claim 29, wherein setting includes setting the at least one bit to in response to a change in address mapping, wherein the at least one bit indicates that the predetermined amount of data is pending a write back to the second level of memory, wherein the first level of memory is a virtually addressed cache memory and the predetermined amount of data is a line of cache data.

31. A method, comprising:
  setting a dirty bit in a cache tag that is associated with a predetermined amount of cache data;
  setting a valid bit in the cache tag; and
  setting a write back bit in the cache tag in response to a change in address mapping in a virtually addressed system if the dirty bit is set and if the valid bit is set.

32. The method of claim 31, wherein the predetermined amount of data is a line of cache data stored in a first level of a memory hierarchy and wherein the write back bit indicates that the cache data is pending a write back to a second level of the memory hierarchy and wherein the dirty bit indicates that the block of data has been modified while in the first level of the memory hierarchy.

33. An apparatus, comprising:
  a processor including:
    a circuit to set at least one bit in response to a change in address mapping and to indicate if a predetermined amount of data is pending a write back, wherein the predetermined amount of data is stored in a first level of a memory hierarchy and wherein the circuit is adapted to prevent access to the predetermined amount of data stored in the first level of the memory hierarchy while the predetermined amount of data is pending a write back to a second level of the memory hierarchy; and
    logic to translate virtual addresses to physical addresses, wherein the first level of the memory hierarchy is a cache memory, the predetermined amount of data is a line of cache data, and the at least one bit is in a cache tag field associated with the line of cache data and the at least one bit is stored in the cache memory.

34. A system, comprising:
  a processor, including logic to translate virtual addresses to physical addresses and a circuit to set at least one bit in response to a change in address mapping and to indicate if a predetermined amount of data is pending a write back, wherein the circuit is adapted to prevent access to the predetermined amount of data stored in a first level of a memory hierarchy while the predetermined amount of data is pending a write back to second level of the memory hierarchy, and wherein the first level of the memory hierarchy is a cache memory, the predetermined amount of data is a line of cache data, and the at least on e bit is in a cache tag field associated with the line of cache data and the at least on bit is stored in the cache memory; and
  an antenna coupled to the processor.

35. The system of claim 34, wherein the system is a wireless phone.

* * * * *

UNITED STATES PATENT AND TRADEMARK OFFICE
CERTIFICATE OF CORRECTION

PATENT NO.        : 7,415,577 B2                                            Page 1 of 1
APPLICATION NO.   : 10/799555
DATED             : August 19, 2008
INVENTOR(S)       : Michael W. Morrow It is certified that error appears in the above-identified patent and that said Letters Patent is hereby corrected as shown below:

Column 8:
Line 58, "farther" should be --further--.

Column 10:
Line 34, "on e bit" should be --one bit--;
Line 35, "on bit" should be --one bit--.

Signed and Sealed this

Seventh Day of October, 2008

JON W. DUDAS
*Director of the United States Patent and Trademark Office*